US012787931B2

(12) United States Patent
Marbach

(10) Patent No.: US 12,787,931 B2
(45) Date of Patent: Nov. 10, 2026

(54) CROP MANAGEMENT

(71) Applicant: GrainSense Oy, Oulu (FI)

(72) Inventor: Ralf Marbach, Oulu (FI)

(73) Assignee: GrainSense Oy, Oulu (FI)

( * ) Notice: Subject to any disclaimer, the term of this patent is extended or adjusted under 35 U.S.C. 154(b) by 791 days.

(21) Appl. No.: 18/023,062

(22) PCT Filed: Jul. 30, 2021

(86) PCT No.: PCT/FI2021/050542
§ 371 (c)(1),
(2) Date: Feb. 24, 2023

(87) PCT Pub. No.: WO2022/043603
PCT Pub. Date: Mar. 3, 2022

(65) Prior Publication Data

US 2024/0008403 A1 Jan. 11, 2024

(30) Foreign Application Priority Data

Aug. 25, 2020 (FI) .................................... 20205829

(51) Int. Cl.
*A01D 41/127* (2006.01)
*G01N 21/33* (2006.01)
*G01N 21/85* (2006.01)

(52) U.S. Cl.
CPC ......... *A01D 41/1277* (2013.01); *G01N 21/33* (2013.01); *G01N 21/85* (2013.01); *G01N 2021/8592* (2013.01)

(58) Field of Classification Search
CPC .... A01D 41/1277; G01N 21/33; G01N 21/85; G01N 2021/8592
See application file for complete search history.

(56) References Cited

U.S. PATENT DOCUMENTS 3,829,590 A 8/1974 Phillips et al.
5,005,774 A * 4/1991 Martin .................. G01N 33/10
73/78

(Continued)

FOREIGN PATENT DOCUMENTS

CN 1284164 A 2/2001
CN 106030284 A 10/2001

(Continued)

OTHER PUBLICATIONS

Gaur et al: Inheritance of protein content and its relationships with seed size, grain yield and other traits in chickpea. Euphytica, 2016, vol. 209, pp. 253-260.

(Continued)

*Primary Examiner* — Claude J Brown
(74) *Attorney, Agent, or Firm* — Laine IP Oy

(57) ABSTRACT

According to an example aspect of the present invention, there is provided a method comprising obtaining a sample of a lot of agricultural grain kernels, determining, from the sample, a kernel protein concentration as a first function of kernel size, determining, from the sample, a kernel mass as a second function of kernel size, determining, from the first function and the second function, a kernel protein mass as a third function of kernel size, and determining, from the second function and the third function, an effect of a sieving operation on a protein concentration of the lot of agricultural grain kernels.

13 Claims, 5 Drawing Sheets

(56) References Cited

U.S. PATENT DOCUMENTS

| | | | | |
|---|---|---|---|---|
| 6,559,655 | B1 * | 5/2003 | Rosenthal | G01N 21/3563<br>250/252.1 |
| 2003/0063276 | A1 | 4/2003 | Sjodin | |
| 2004/0052398 | A1 | 3/2004 | Weiss et al. | |
| 2015/0355083 | A1 * | 12/2015 | Marbach | G01N 21/3563<br>356/402 |
| 2017/0045444 | A1 | 2/2017 | Haiges et al. | |
| 2018/0259446 | A1 * | 9/2018 | Coffey | G01N 15/00 |

FOREIGN PATENT DOCUMENTS

| | | | | |
|---|---|---|---|---|
| CN | 106170692 | A | 11/2016 | |
| EP | 2168419 | A1 | 3/2010 | |
| JP | H06106139 | A | 4/1994 | |
| JP | H1144686 | A | 2/1999 | |
| JP | H1183733 | A | 3/1999 | |
| JP | 2002107295 | A | 4/2002 | |
| JP | 2004150877 | A | 5/2004 | |
| JP | 2015535084 | A | 12/2015 | |
| WO | WO2015071706 | A1 | 5/2015 | |
| WO | WO-2016096839 | A1 * | 6/2016 | A01F 12/44 |

OTHER PUBLICATIONS

Liu: Some factors affecting sieving performance and efficiency. Powder Technology, 2009, pp. 208-213.

Tsatsaragkou et al: Improving Carob Flour Performance for Making Gluten-Free Breads by Particle Size Fractionation and Jet Milling. Food Bioprocess Technol, Jan. 17, 2017, vol. 10, No. 5, pp. 831-841.

* cited by examiner

CROP MANAGEMENT

FIELD

The present invention relates to management of crops, such as, for example, wheat or barley.

BACKGROUND

Crops, such as wheat or barley, are widely cultivated around the world. Grain produced in different circumstances has differing characteristics, for example, differences in soil, sunlight and use of fertilizers affects the way grains grow. A same field may produce grains with different characteristics in different seasons depending on specifics of the growing seasons. Examples of such specifics include the quantity and timing of rains, the temperature, wind profiles and the amount and timing of sunlight falling on the field.

When discussing wheat, its protein content is of interest. Wheat lots may be sought specifically based on their protein content, since the quantity of protein has an effect on the usability of the wheat. Wheat with a high protein content may be usable in baking bread, while wheat with lower protein content may be usable in feeding animals, but not making bread. On the other hand, low-protein content wheat may be ideal for making soft wheat for baking cookies.

Protein overall is an important macronutrient for human consumption, wherefore securing a sufficient supply of protein is vital in securing a sufficient food supply for human populations. In the case of fruits, their oil content can be relevant to their usability in different purposes, as well as being relevant in determining their nutritional value for humans.

Individual lots of wheat and other granular crops have been classified according to protein or oils content at different levels of production and distribution. Lots, such as truckloads, of crops have been classified and sorted, which has enabled, for example, combining lots such that the combined lot remains usable for an intended purpose, such as baking bread, for example.

SUMMARY OF THE INVENTION

According to some aspects, there is provided the subject-matter of the independent claims. Some embodiments are defined in the dependent claims.

According to a first aspect of the present invention, there is provided a method comprising obtaining a sample of a lot of agricultural grain kernels, determining, from the sample, a kernel protein concentration as a first function of kernel size, determining, from the sample, a kernel mass as a second function of kernel size, determining, from the first function and the second function, a kernel protein mass as a third function of kernel size, and determining, from the second function and the third function, an effect of a sieving operation on a protein concentration of the lot of agricultural grain kernels.

According to a second aspect of the present invention, there is provided an apparatus comprising at least one processing core, at least one memory including computer program code, the at least one memory and the computer program code being configured to, with the at least one processing core, cause the apparatus at least to obtain, concerning a sample of a lot of agricultural grain kernels, a kernel protein concentration as a first function of kernel size, obtain, concerning the sample, a kernel mass as a second function of kernel size, determine, from the first function and the second function, a kernel protein mass as a third function of kernel size, and determine, from the second function and the third function, an effect of a sieving operation on a protein concentration of the lot of agricultural grain kernels.

EMBODIMENTS

By estimating whether a sieving operation could improve a usability of a lot of grain, overall usability of lots of grain is enhanced since some lots may be enhanced by sieving, and on the other hand lots which cannot be improved by sieving may be left as-is, with no loss of mass in unnecessary sieving. A benefit may thus be obtained, in that a broader set of end products may be produced with given lots of grain and further, unnecessary sieving operations may be avoided. Put in other words, a given lot of grain may be usable in a broader set of technically differing production processes.

Figure 1:
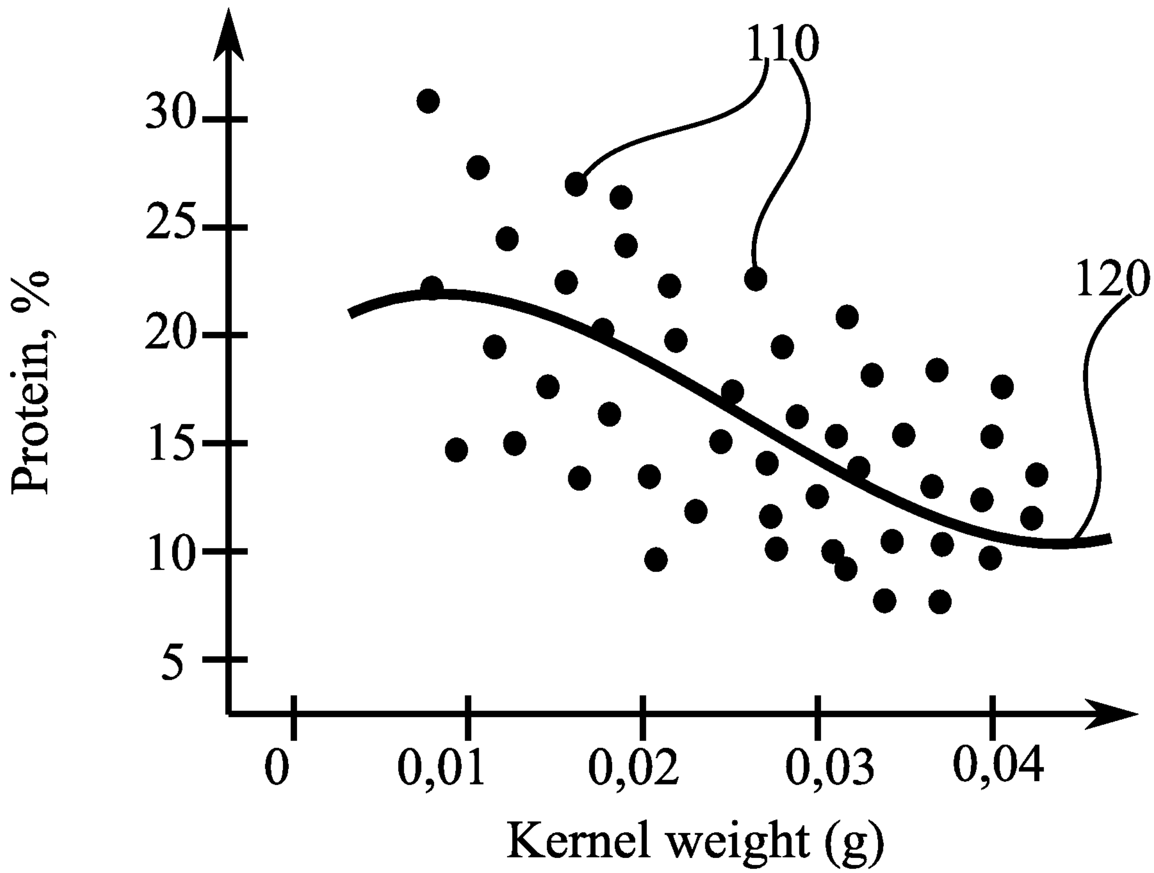
FIG. 1 illustrates an example mapping between kernel weight and protein content.

FIG. 1 illustrates an example mapping between kernel weight and kernel protein content. Sorting of cereal grains and other granular crops according to protein or oil content may take place, as noted, at different stages of a distribution process. Sorting of lots of grain, for example truckloads, such as wheat, has been performed in collection and distribution chains of industrialized nations. Quality laboratories may be employed to analyse grains, to determine content fractions of grain, such as moisture and protein. Usage decisions may be based on such analyses.

To analyse a lot of grain, a sample of the lot may be obtained. For example, one litre of grain may comprise a representative sample of a truckload of grain. Automatic sampling mechanisms may be used to collect the sample from plural locations in the lot. Two samples may be obtained, to enable performing a repeat analysis from the other sample at a later point in time.

As noted above, the usability of wheat, for example, depends on the protein content. In various bread baking processes, a protein content of >12.5% is required, for example. Other processes have different thresholds, for example 12%. In principle, since protein content varies greatly from kernel to kernel, a highly usable processing of a lot of grain could comprise sorting the lot individually kernel by kernel, to obtain sub-lots of kernels of greatly varying protein content. For example, FIG. 1 illustrates that kernels vary in protein content from 10% to 30%. However, in practical terms analysing all individual kernels of a lot is very arduous. Assuming a kernel weight of 40 mg, a throughput of 10 tons per hour would involve analysing 69400 kernels per second, kps. Analysing an internal characteristic, such as protein, moisture or oils content, of a kernel so quickly is difficult to perform successfully. Analysing such internal characteristics may be accomplished using multi-wavelength spectroscopy, for example in the near infrared range.

It is therefore sought to obtain at least part of the benefit of individual kernel sorting, in a simpler device and method than going individually through all the kernels of a lot. Embodiments described herein separate measurement from processing stages, such that unnecessary processing, for example sieving, may be avoided. Simple optical measurement devices may be used already at the farm, which maximizes the value of P vs. KS information since lots of kernels have not yet been mixed with each other lots from other farms, which reduces the slopes of P vs. KS curves, as will be explained herein below.

FIG. 1 illustrates results of measurement of individual kernels. The kernel results are black dots 110, and curve 120 has been fitted to the results. As can be seen from the figure, there is a trend in that smaller kernels tend to have larger protein content and larger kernels tend to have lower protein content. As heavier kernels in general are larger, sieving away smaller kernels could result in a sub-lot with enhanced protein content, however, the resulting change in protein concentration may be relatively modest and varying from lot to lot.

In general, as a kernel of wheat grows, in the absence of stressing factors, it will reach its “full” carbohydrate content. The protein content is more fixed in the beginning of the kernel growth process. In case of stressing factors, such as lack of sunlight or nutrients, the carbohydrate content will be less than maximal, while the protein content is less affected by stressing factors. This, simply put, results in the trend where smaller kernels, grown under some stress, have a larger protein concentration than larger ones, grown under less stress and which have therefore accumulated more carbohydrates.

FIG. 1 also illustrates that while there is a trend to lower protein content in larger kernels, the trend is noisy and apparent only in a larger sample of kernels. Indeed, even kernels from a same head of wheat may exhibit a variation of about 5%-points in protein content. The fitted curve 120 will consequently be different for different lots of kernels, in dependence on growth conditions and seasonal variance. Curve 120 may be seen as representing a kernel protein mass as a function of kernel size.

Sieving performs responsively to the size of kernels. In general, kernel mass is well correlated with size, with heavier kernels being correspondingly larger in size. A shape of a kernel is fairly conserved within a species of grain. Even a linear dimension, such as length, is fairly well positively correlated with kernel weight. Consequently the relationship between kernel size and kernel mass may be seen as quite uncomplicated. A diameter of a kernel may be taken as the kernel size, for example, since the diameter is what a sieve will select when used on a lot of kernels.

In practice, the inverse correlation of protein content to kernel size, being the steepness of curve 120, is strongest where local growing conditions have been stressed the most. Since embodiments of the present invention described herein below describe how to measure the a kernel protein mass as a function of kernel size and to minimize its effect, in many cases the benefit in terms of enhancing the usability of a lot of grain is greatest where it is most needed, that is, where growth has been stressed. In case growth was not stressed, curve 120 may be relatively flatter. Usually curve 120 will exhibit the negative correlation between kernel size and protein concentration, but the extent of the negative correlation, that is, the steepness, is in general unknown until it is determined for a specific lot of kernels.

Inspection of FIG. 1 reveals an interesting fact. While the correlation between protein concentration, P, and kernel mass, M, is low, there is a significant slope. In other words, when binning the results into, say, 20 different kernel-size bins, say the first bin from 4 to 6 milligrams, mg, then 6 to 8 mg, and so on, until the last bin 43 to 44 mg, and averaging over the single-kernel results in each bin and then plotting the averages, a curve like curve 120 would result. In the example of FIG. 1, the difference between the average single-kernel protein concentration for 20 mg kernels, P(20 mg)=17%, and the average single-kernel protein concentration for 40 mg kernels, P(40 mg)=11%, is estimated at around 6%. Since the kernel-to-kernel variation within any one size bin is on the same order, it would be hard to visually detect the P-vs-KS correlation if we were given only the results of a few kernels. Furthermore, in a “local” set of kernels, from a single field, the P-vs-KS relationship is probably always fairly non-linear, which makes detection of correlation even more difficult.

In practice, however, the numerical correlation value is less relevant than the slope of the bin-averaged curve. Wheat is, in practice, handled in such large volumes that a smooth P-vs-KS curve will be present, averaged over the lot. Once the smooth curve is estimated with sufficient accuracy for a lot of kernels, it is possible to define customized kernel-size thresholds for a possible sieving operation to modify the characteristics of the lot. Whether the operation is reasonable to perform in practice may be determined in advance. In a very clear example, if the bulk protein concentration of the original wheat lot were 12.4%, and the single-kernel distribution were similar to FIG. 1, then it would be very sensible to increase the protein content to a value safely above a technical threshold of 12.5% by sieving away, say, 10% of the mass. As a result, 90% of the original lot could be used in baking bread and only 10% of the original mass, in the form of the largest kernels, would allocated to feeding animals, for example. In general, a large benefit from such a process may be obtainable when the protein concentration of a lot is initially close to a technical threshold for a baking (or other use) process. Even when a sieving operation is not done, a more detailed understanding of characteristics of the kernel lot may be useful in the milling stage, for example, to optimize milling parameters.

In general, the following steps may be taken to estimate an effect of a hypothetical sieving operation:

- a representative sample of kernels is obtained, for example, 10.000 kernels or more
- the kernel protein concentration as function of kernel size (P vs. KS) is determined for the sample
- the kernel mass as function of kernel size (M vs. KS) is determined for the sample the protein mass as function of kernel size (PM vs. KS) is determined from the two preceding functions: the protein concentration as function of kernel size and the kernel mass as function of kernel size
- an effect of a sieving operation is estimated based on the mass as function of kernel size and the protein mass as function of kernel size. For example, if the lot were divided into two sub-lots with different kernel size ranges, what would be the resulting mass percentages and/or protein concentrations be? Further or alternatively, a sieve hole size may be determined which would produce a sub-lot fulfilling a protein concentration condition, for example to enable the use of this sub-lot in a specific bread baking process. Such a protein concentration condition may comprise a minimum protein concentration requirement, for example that the protein mass concentration should be at least 12.5%.

A computerized device may be configured to analyse the grain lot as described above, by receiving as inputs the P vs. KS and M vs. KS functions, for example in terms of a finite number of bins, and returning as output the estimated effect of the sieving operation. Alternatively or in addition, the computerized device may be arranged to control the obtaining of the P vs. KS and M vs. KS functions automatically, as will be laid out herein below.

Closed-loop control may be installed, such that the sieve hole size is determined based on the mass as function of kernel size and the protein mass as function of kernel size and the lot of grain is sieved into at least two sub-flows. The sub-flows may be analysed to determine their protein concentrations, and this information may be fed back to the original sieving stage, to maintain the sub-flows at their desired protein concentration characteristics. Closed-loop control may be used in a continually flowing "lot" of kernels.

In some embodiments, manual measurement of a sample is employed. In these embodiments, a representative sample of, for example one or two litres of wheat is obtained from a larger lot of wheat, or other grain. This sample is then sieved to at least five different size bins, for example using a set of sieves. The weights of each of the at least five size bins are then determined. From these measurements, a function of mass as a function of kernel size may be determined, five points being sufficient to perform this fitting. Next, the protein concentration of each sieve fraction may be performed. Chemical or optical spectroscopic analysis methods may be employed, for example. Optical spectroscopic analysis may be performed using a handheld integrating optical cavity, such as one produced by Grainsense, Finland, for example.

From the mass as a function of kernel size and the protein content as function of kernel size, the protein mass as function of kernel size distribution may be obtained. The protein mass as function of kernel size enables determining an effect of a sieving operation on the lot of grain.

Alternatively to manual measurement, automatic measurement may be employed. An automated integrating optical cavity, for example sphere, can be built, which measures individual kernels moving through the integrating cavity in single file, that is, one after another and with such time intervals that only a single kernel is inside the cavity at any one time. Such an apparatus is illustrated in FIG. 2.

Figure 2:
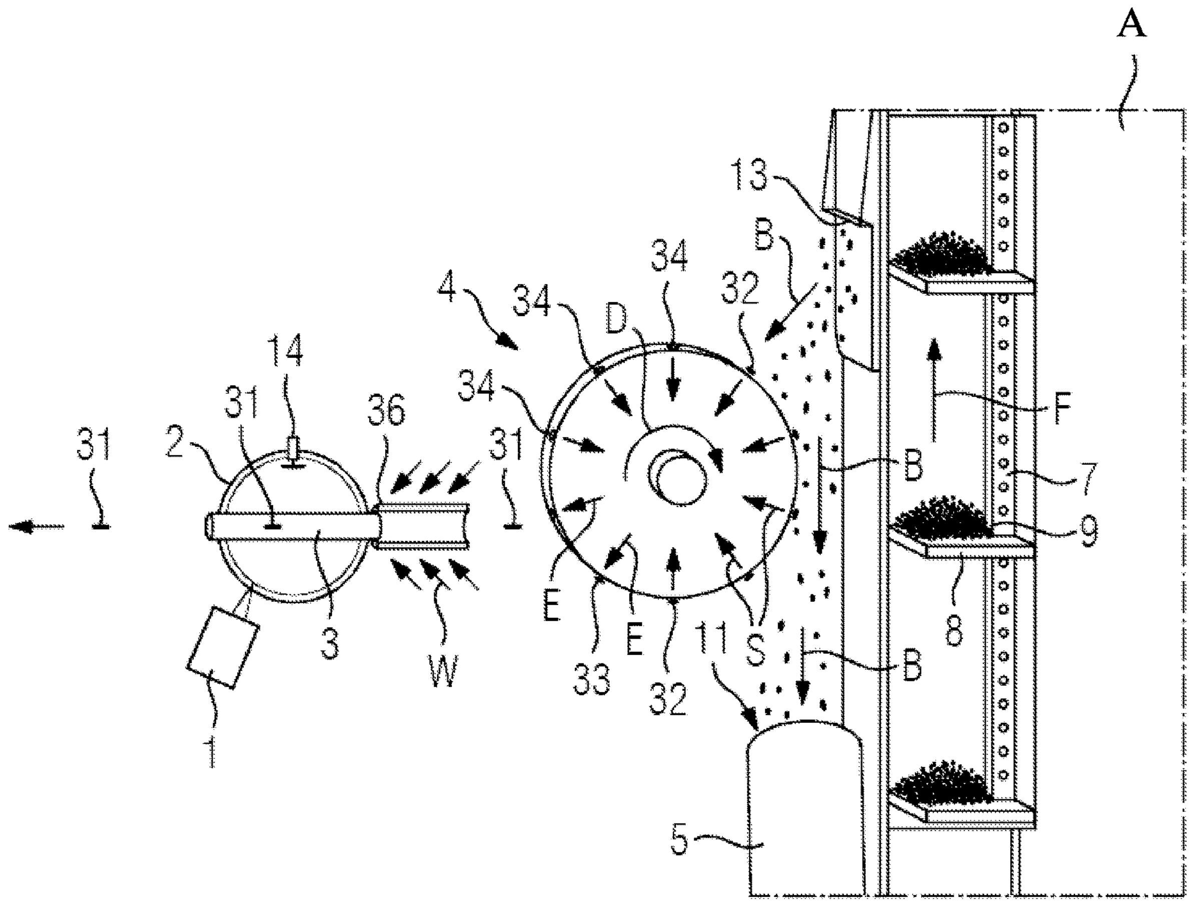
FIG. 2 illustrates an example automatic measurement arrangement.

FIG. 2 illustrates an example automatic measurement arrangement. A combine harvester A is schematically illustrated on the right. Paddles 8 are moved by conveying chain 7 into the conveying direction F.

Controllable opening 13 is opened in such a way that the throughput of grain 9 is sufficient to generate a flow of grain alongside combine harvester A. This flow might be continuous or timed. Correspondingly, the controllable opening 13 is opened either at regular intervals or is held open continuously. After passing through the controllable opening 13 the grain 9 is moved by the gravitational force into direction B. Consequently, the grain 9 is passed through an access area of a sampling wheel 4, where sample openings 34 are connected to a chamber of under pressure producing suction at the sample openings 34. Therefore the sample openings 34 attract single grains 9 and stop 10 attracting more grain 9 when the sample opening is clogged by the attracted single grain 9.

The radially oriented arrows on the sample wheel 4 indicate the locations on the sample wheel 4, where either under pressure or over pressure is applied to the respective sample opening 34. Once a single grain 9 is held by a sample opening 34 it is referred to as sampled grain 32, being attached to sampling wheel 34.

The sampled grain 32 follows a point on the surface of sampling wheel 4 in its rotational movement in direction D until it reaches the circumferential location with a direction E of air pressure. The pressure switch may be aligned with this rotational velocity of the sampling wheel 4 in order to turn the sampled grain 32 first into an accelerated sampled grain 33 and then into a freely moving sampled grain 31 passing, optionally, through an optional guiding tube 36. After the accelerated, sampled grain 33 has departed from the sample opening 34, it undergoes a directional pressure change and opening 34 continues to move back into the access area for picking up another single grain 9.

Advantageously, the sample openings 34 are not clogged with dirt, since applying the over pressure and under pressure and, in particular, the change between both pressure states keeps the inside of the sample opening 34 clean. Inside the guiding tube 36 there may be a continuous flow W introduced that carries the sampled moving grain 31 through a probe tube 3 and eventually out of the optical analyzer. Probe tube 3 may comprise a transparent tube. Once the accelerated sampled grain 33 has left the sampling wheel 4, it is referred to as a sampled moving grain 31, which is caught by the guiding flow W inside the guiding tube 36 and in the following through the probe tube 3, where it gets optically analyzed. The flow W allows to better control the transport velocity of the sampled moving grain 31.

Light source 14 is configured to shining light on a reflective baffle, which diffusely reflects the light onto the inner walls of the integrating sphere 2, where the light is once again reflected diffusely. If the sampled grain, however, spectrally interacts with part of the diffuse light, whereby some of it is transmitted or reflected on the sampled grain 31 being passed through tube 3, the sampled moving grain 31 leaves its characteristic spectral fingerprint to the probing light. The probing light, which has interacted with the sampled grain 31, carries information on the grain ingredients in terms of an absorption spectrum, which can be analyzed and/or stored by the spectral analyzer 1.

To analyze 100 kernels per second, kps, with realistic dimensions and a lamp power of around 10 Watts, about 5 milliseconds may be available for measuring each kernel in the cavity. This is a realistic measurement rate. An ultraviolet light may be separately used to measure the size of each kernel, as described herein in below.

Figure 3:
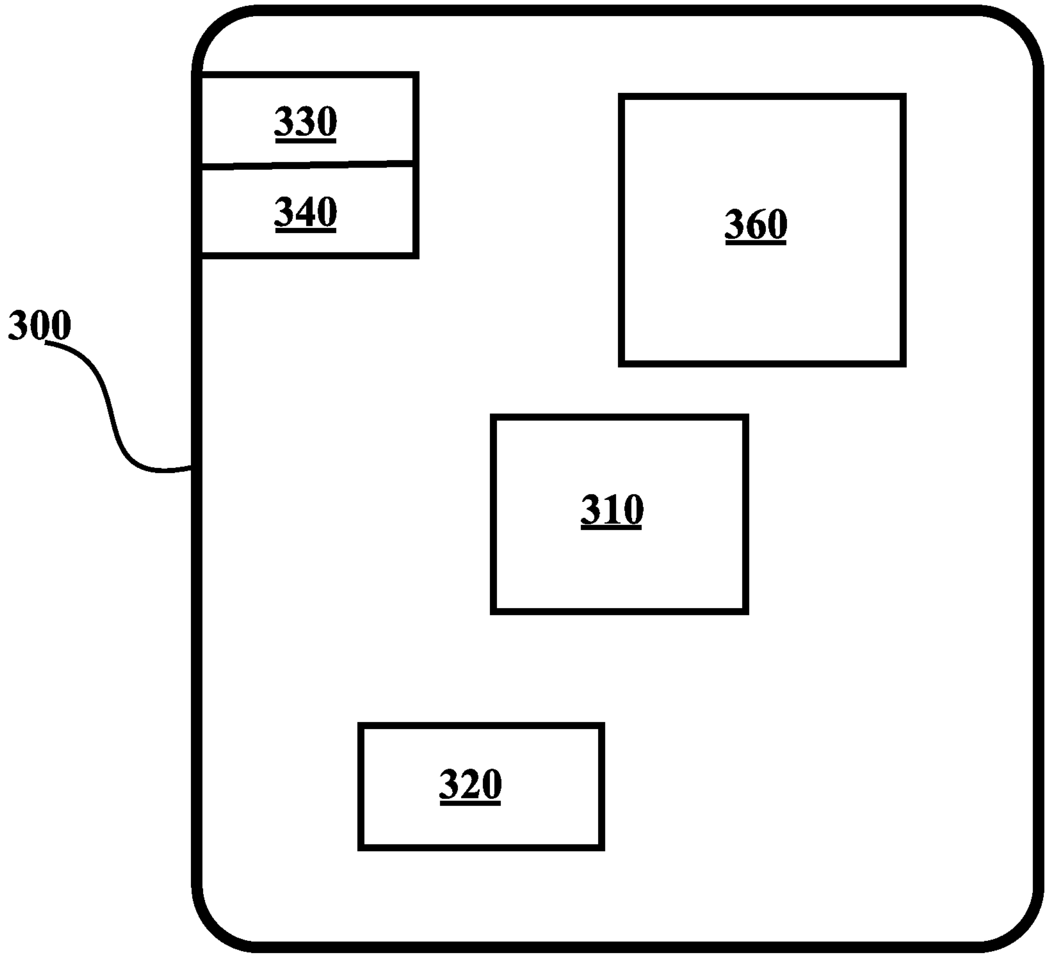
FIG. 3 illustrates an example apparatus capable of supporting at least some embodiments of the present invention.

FIG. 3 illustrates an example apparatus, for example the computerized device disclosed above, capable of supporting at least some embodiments of the present invention. Illustrated is device 300, which may comprise, for example, a computing device. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example simulate effects of sieving operations on lots of grain.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above.

Processor 310, memory 320, transmitter 330, receiver 340 and/or UI 360 and/or may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
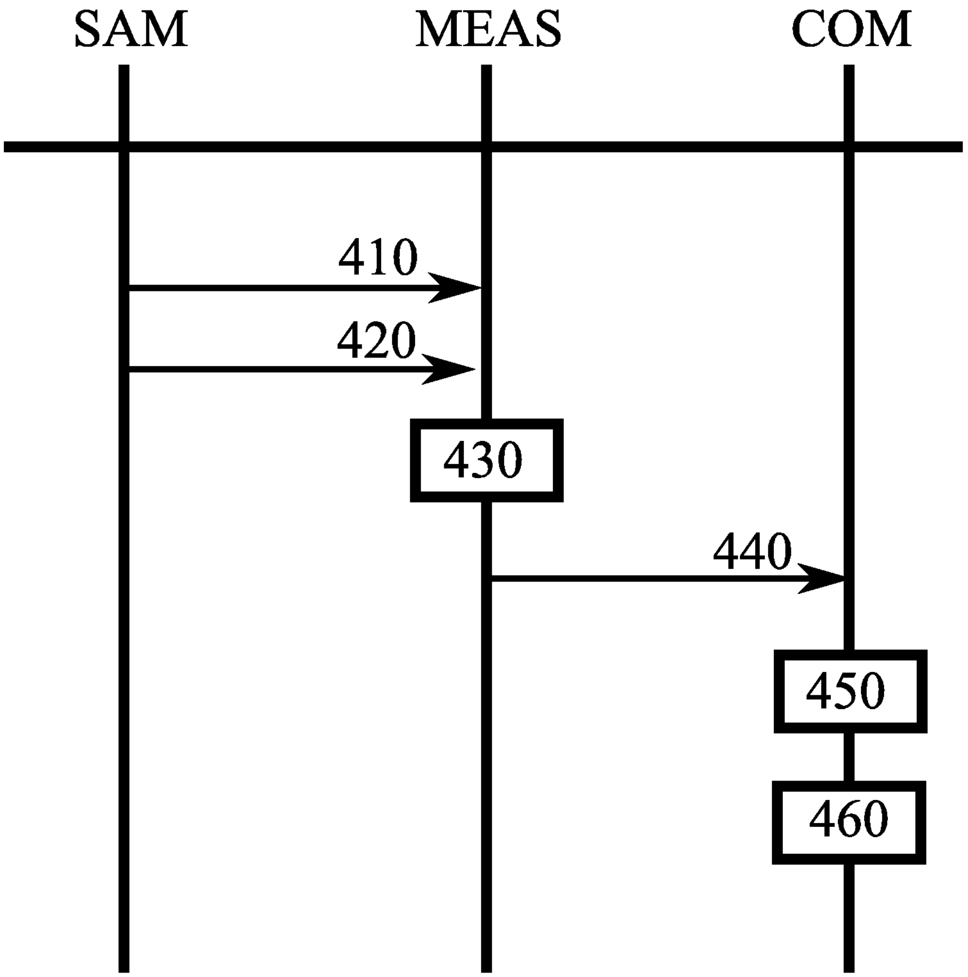
FIG. 4 illustrates signalling in accordance with at least some embodiments of the present invention.

FIG. 4 illustrates a process in accordance with at least some embodiments of the present invention. On the vertical axes are disposed, on the left, sampling device SAM, in the centre measurement unit MEAS and on the right, a computing unit COM, for example the computerized device mentioned above. Time advances from the top toward the bottom.

In initial phases 410 and 420, which may be continuous phases, a representative sample of a lot of grain, such as wheat or barley, is obtained by sampling unit SAM. As described herein above, the sample may be of plural parts of the lot, to account successfully for intra-lot variation in the kernels of the lot.

In phase 430, the measurement unit MEAS determines, for the sample, the kernel protein concentration as a function of kernel size and the kernel mass as a function of kernel size. These functions are communicated to the computing unit COM in phase 440. The computing unit COM in phase 450 derives, from the functions received in phase 440, the protein mass as a function of kernel size for the sample, and an estimate of a result of a sieving operation. Phase 460 comprises at least one of displaying the protein mass as a function of kernel size and displaying the estimate of the result of the sieving operation.

Figure 5:
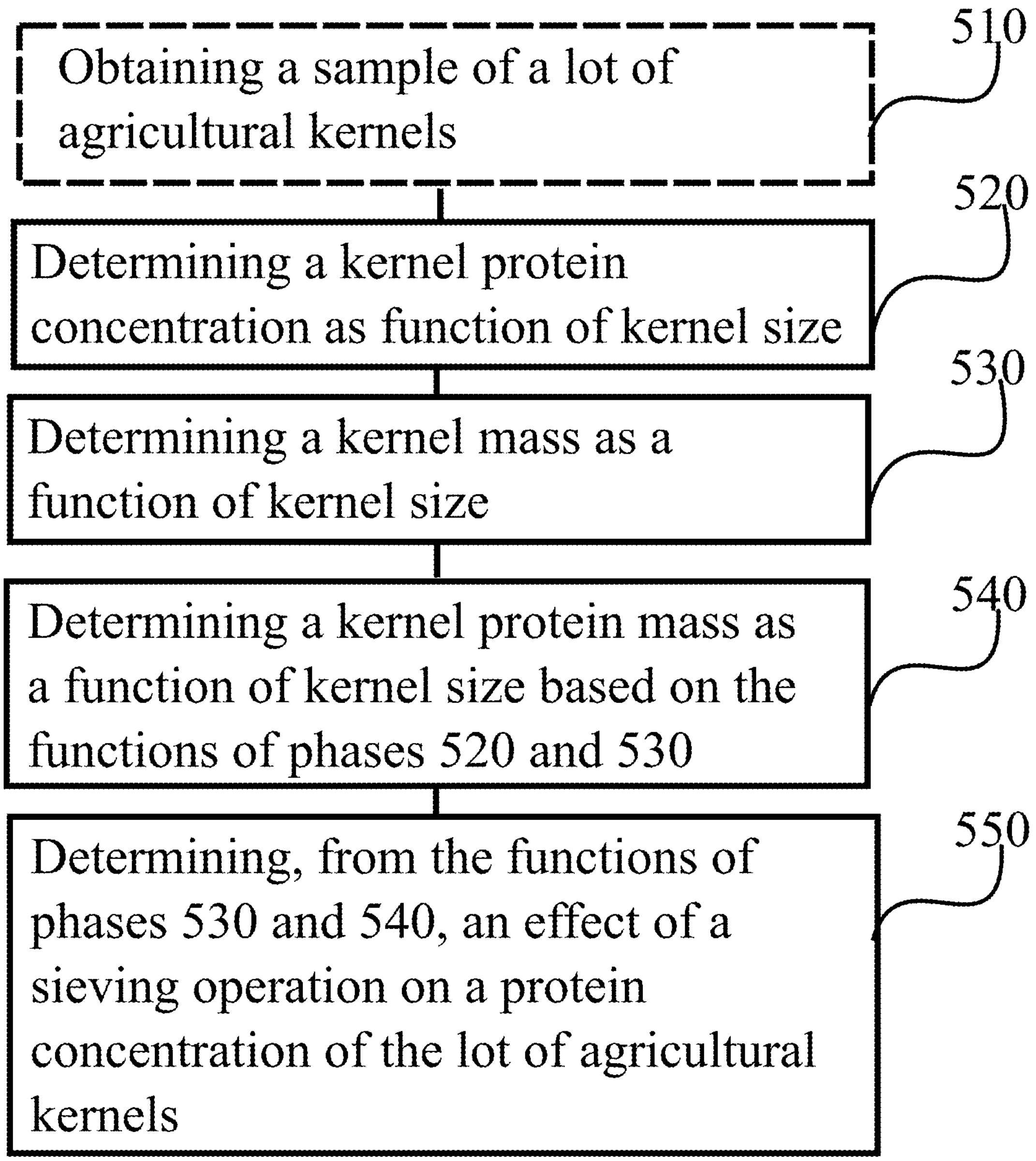
FIG. 5 is a flow graph of a method in accordance with at least some embodiments of the present invention.

FIG. 5 is a flow graph of a method in accordance with at least some embodiments of the present invention. The phases of the illustrated method may be performed in device 110, an auxiliary device or a personal computer, for example, or in a control device configured to control the functioning thereof, when installed therein.

Phase 510 comprises obtaining a sample of a lot of agricultural grain kernels. Phase 510 is optional. Phase 520 comprises determining, from the sample, a kernel protein concentration as a first function of kernel size. Phase 530 comprises determining, from the sample, a kernel mass as a second function of kernel size. Phase 540 comprises determining, from the first function and the second function, a kernel protein mass as a third function of kernel size. Finally, phase 550 comprises determining, from the second function and the third function, an effect of a sieving operation on a protein concentration of the lot of agricultural grain kernels.

When using an optically integrating cavity to measure kernel composition, for example of wheat or barley kernels, an ultraviolet, UV, light source, such as for example a UV light-emitting diode, LED, may be configured to illuminate the inside of the cavity. With the kernel in the cavity, the extent of UV absorption in the cavity, relative to an empty cavity, is proportional to the kernel surface area, as long as the UV wavelength is chosen so that the absorbance coefficient is high. In this case, practically all photons hitting the kernel will be absorbed in the kernel surface. This may be used to quickly determine the kernel volume, for example in an integrating cavity such as that described in connection with FIG. 2, or used in connection with the manual measurement embodiments described above. For example, the UV wavelength may fall within the interval of 340 to 390 nanometres. Advantageously, the protein content may be determined, and then (or before) a UV flash may be used to determine the volume of that particular kernel, creating an accurate understanding of individual kernels in the sample.

A silicon-based light detector, for example, may be employed to detect the extent of UV light intensity decline, and thus the extent of the absorbance, when the kernel is in the integrating cavity.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases “in one embodiment” or “in an embodiment” in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs “to comprise” and “to include” are used in this document as open limitations that neither exclude nor require the existence of also un-recited features. The features recited in depending claims are mutually freely combinable unless otherwise explicitly stated. Furthermore, it is to be understood that the use of “a” or “an”, that is, a singular form, throughout this document does not exclude a plurality.

INDUSTRIAL APPLICABILITY

At least some embodiments of the present invention find industrial application in enhancing the usability of grain, such as wheat or barley.

ACRONYMS LIST

M kernel mass
kps kernels per second
KS kernel size
P protein concentration
PM protein mass

REFERENCE SIGNS LIST

| | |
|---|---|
| 110 | kernel results |
| 120 | fitted curve |
| 7 | conveying chain |
| 9 | grains (kernels) |
| 13 | opening |
| 4 | sampling wheel |
| 32 | sampled grain |
| 33 | accelerated sampled grain |
| 34 | sample opening |
| 31 | sampled mobbing grain |
| 36 | guiding tube |
| 2 | integrating sphere (cavity) |
| 14 | light source |
| 3 | probe tube |
| 1 | spectral analyzer |
| 300-360 | structure of the device of FIG. 3 |
| 410-460 | phases of the method of FIG. 4 |
| 510-550 | phases of the method of FIG. 5 |

The invention claimed is:

1. A method comprising:

obtaining, using an automatic sampling mechanism, a sample of a lot of agricultural grain kernels;

determining, from the sample by measurement by an automated integrating optical cavity, a kernel protein concentration as a first function of kernel size;

determining, from the sample by measurement by the automated integrating optical cavity, a kernel mass as a second function of kernel size;

determining, from the first function and the second function, a kernel protein mass as a third function of kernel size, and determining, from the second function and the third function, an effect of a sieving operation on a protein concentration of the lot of agricultural grain kernels, wherein, based on the effect of the sieving operation on the protein concentration, a sieve hole size is determined which produces in the sieving operation a sub-lot from the lot of agricultural grain kernels which fulfils a protein concentration condition, and displaying the determined effect of the result of the sieving operation, and operating a closed-loop control of the sieving operation, such that the lot of agricultural grain kernels is sieved into at least two sub-flows, protein concentrations of the sub-flows are obtained and used to modify the sieving operation during the sieving operation in a continuous process, such that protein concentrations of the sub-flows are maintained at desired levels.

2. The method according to claim 1, wherein the effect of the sieving operation is determined for more than one sieve opening size.

3. The method according to claim 1, further comprising determining, based on the second function and the third function, sieving parameters which would increase protein concentration of the lot above a specific threshold.

4. The method according to claim 1, further comprising performing the sieving operation.

5. The method according to claim 1, wherein determining the second function comprises sieving the sample into at least five size bins, and measuring weights of each of the at least five size bins, and wherein determining the first function comprises measuring protein content of each of the at least five size bins.

6. The method according to claim 1, wherein determining the first function and the second function comprises analysing individual kernels one at a time in an optically integrating cavity.

7. The method according to claim 6, wherein the individual kernels are propelled through the integrating cavity using pressurized air.

8. The method according to claim 7, wherein the kernels are propelled through the integrating cavity from a sampling device attached to a combine harvester.

9. The method according to claim 7, further comprising propelling more than 70 kernels per second individually through the integrating cavity.

10. The method according to claim 1, wherein the kernels comprise kernels of wheat.

11. An apparatus comprising at least one processing core, at least one memory including computer program code, the at least one memory and the computer program code being configured to, with the at least one processing core, cause the apparatus at least to:

obtain, using an automatic sampling mechanism, concerning a sample of a lot of agricultural grain kernels, a kernel protein concentration as a first function of kernel size;

obtain, in an automated integrating optical cavity, concerning the sample, a kernel mass as a second function of kernel size;

determine, from the first function and the second function, a kernel protein mass as a third function of kernel size, and determine, from the second function and the third function, an effect of a sieving operation on a protein concentration of the lot of agricultural grain kernels, wherein, based on the effect of the sieving operation on the protein concentration, a sieve hole size is determined which produces in the sieving operation a sub-lot from the lot of agricultural grain kernels which fulfils a protein concentration condition, and display the determined effect of the result of the sieving operation, and operate a closed-loop control of the sieving operation, such that the lot of agricultural grain kernels is sieved into at least two sub-flows, protein concentrations of the sub-flows are obtained and used to modify the sieving operation during the sieving operation in a continuous process, such that protein concentrations of the sub-flows are maintained at desired levels.

12. The apparatus according to claim 11, wherein the apparatus is configured to determine effect of the sieving operation for more than one sieve opening size.

13. The apparatus according to claim 11, wherein the apparatus is configured to determine, based on the second function and the third function, sieving parameters which would increase protein concentration of the lot above a specific threshold.

* * * * *